UNITED STATES PATENT OFFICE.

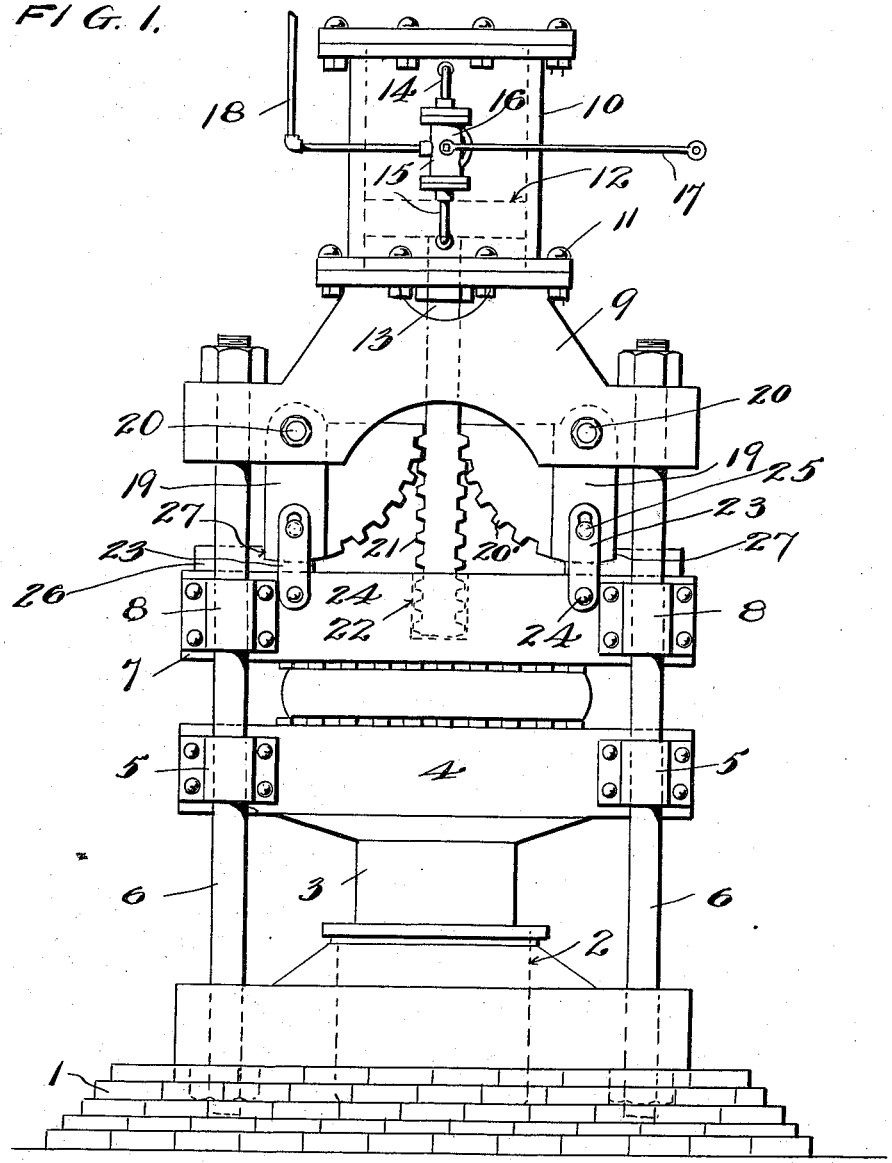

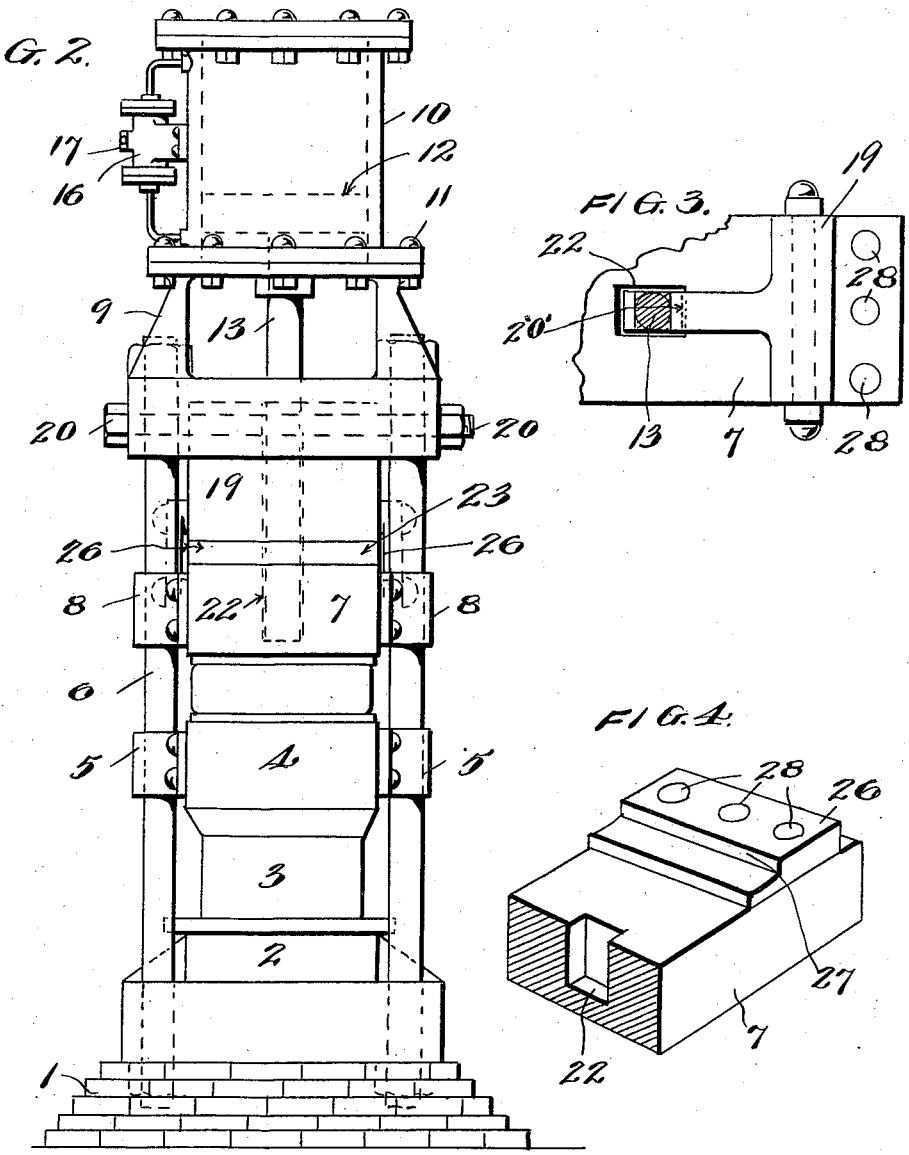

DE LESLIE C. FITCH, OF BATON ROUGE, LOUISIANA.

PRESS.

1,023,145.  Specification of Letters Patent.  Patented Apr. 16, 1912.

Application filed November 7, 1911. Serial No. 659,017.

*To all whom it may concern:*

Be it known that I, DE LESLIE C. FITCH, a citizen of the United States, residing at Baton Rouge, in the parish of East Baton Rouge and State of Louisiana, have invented certain new and useful Improvements in Presses, of which the following is a specification.

This invention relates to presses and has particular reference to a machine of this character for repressing bales of cotton or the like.

The cotton direct from the gin is ordinarily pressed into comparatively large bales which have to be repressed before the cotton can be shipped, to save space. The machine for repressing bales of cotton has to be strong and capable of exerting a high pressure. When the bale of cotton is placed in the second press to be repressed, the iron bands having been previously removed therefrom, said bale will expand and take up a considerable amount of space. In the first part of the operation of the recompressor, very little force is necessary to press the soft expanded bale of cotton into its original size. The ordinary recompressor wastes a great deal of power and time in the first part of the process of recompressing the bale. After the bale is recompressed to its original size, greater pressure is necessary to further compress it.

An important object of this invention is to provide a machine of the above mentioned character, so constructed that the first part of its compressing operation will be quick to take up lost space and compress the soft expanded bale to its original size and the subsequent part of such compressing operation will be slow and exerting greater pressure.

A further object of this invention is to provide a press which is compact, strong, and quick and cheap to operate, saving both time and power.

Other objects and advantages of this invention will be apparent during the course of the following description.

In the accompanying drawings forming a part of this specification and in which like numerals are employed to designate like parts throughout the same, Figure 1 is a front elevation of my press, showing the platens forced together for compressing a bale of cotton, Fig. 2 is a side view of the same, the elements being disposed in the same positions, Fig. 3 is a plan view of one of the sectors, and, Fig. 4 is a perspective view of one of the chairs, showing the same fixedly mounted upon the upper platen.

In the drawings wherein is illustrated a preferred embodiment of my invention, the numeral 1 designates a base or foundation, formed of brick or the like, and upon which is mounted a hydraulic ram or press comprising a cylinder 2, receiving a reciprocatory plunger 3. At its upper end, this plunger has connection with a lower vertically movable platen or bed 4, provided at its corners with guide brackets 5, to travel on uprights or vertical posts 6, as shown. These posts 6 are rigidly connected with the foundation 2, as shown.

Disposed above the platen or bed 4 is an upper vertically movable platen 7, provided at its corners with guide brackets 8, to receive the posts 6, as shown. Rigidly connected with the upper ends of the posts 6 is an arch-frame 9, upon the upper portion of which is rigidly mounted a cylinder 10, secured thereto by bolts 11 or the like. A piston 12 is mounted to reciprocate within this cylinder and a rod 13 is rigidly connected with the piston. Steam is supplied into the upper and lower ends of the cylinder 10 through pipes 14 and 15, having connection with a common valve structure 16. Connected with this valve structure is a lever or handle 17, which when swung downwardly will operate the interior mechanism of the valve structure 16 to supply steam into the lower portion of a cylinder 10 through the pipe 15. When this handle 17 is moved upwardly from its normal horizontal position steam will be supplied to the pipe 14 into the upper end of the cylinder 10. A pipe 18 supplies steam to the valve structure 16.

Disposed above the upper platen 7 are sectors 19, arranged within the arch-frame 9 and having pivotal connection therewith by heavy pins 20, as shown. As more clearly shown in Fig. 3, the outer portion of each of these sectors is formed thick, while the inner portion thereof is reduced in thickness and provided upon its curved edge with teeth 20', to engage teeth 21 formed upon the lower portion of the rod or bar 13. The platen 7 is provided midway its ends and upon its upper surface with a well or opening 22, to receive the lower end of the rod or bar 13, for a purpose to be described.

Disposed upon opposite sides of the upper platen 7 and near the ends thereof are rigid links 23, pivotally connected with this upper platen through the medium of pins or bolts 24. The upper ends of these links are pivotally connected with the outer large portions of the sectors 19 through the medium of pins or bolts 25, as shown. The openings formed through the upper ends of the links 23 for receiving the pins 25 are slightly elongated, as shown, to provide a slight vertical play of the pins 25 with respect to said links.

Rigidly mounted upon the upper surface of the platen 7 adjacent the ends thereof and between the posts 6 are metal chairs 26, provided with vertical shoulders or stops 27. These chairs are rigidly connected with the platen 7 by bolts 28 or the like.

The operation of the press is as follows:— The platen 7 is moved to its uppermost position and the platen 4 is moved to its lowermost position. The metallic bands are removed from the bale of cotton, which is now placed between these platens. The bale of cotton expands and is comparatively soft and it requires only a comparatively low pressure to compress the same to its normal size or a little less. Steam is now introduced into the upper end of the cylinder 10, forcing the piston 12 downwardly and effecting a corresponding movement of the rod 13. The sectors 19 are swung outwardly and downwardly and through the medium of the links 23 effect a quick downward movement of the platen 7, to compress the comparatively soft bale. The movement of the sectors 19 is stopped when the same engage the chairs 26 and the shoulders 27 thereof. These sectors are thus temporarily locked in this position. Attention is called to the fact that when the sectors 19 engage the chairs 26 the lower end of the rod 13 will also engage the bottom wall of the well or opening 22. Pressure is now introduced into the cylinder 2, causing the piston 3 and platen 4 to move upwardly, for compressing the bale against the now stationary upper platen 7. The heavy pressure to be placed upon the bale is exerted thereon by the lower platen 4. This heavy pressure is transferred to the upper platen 7 and to the arch-frame 9 through the medium of the sectors 19. When the sectors are in the position shown in Fig. 1, the burden of the pressure is in perpendicular lines passing through the pins 20. This pressure is not taken up by the links 23, owing to the elongated openings formed through the upper end of these links. The engagement of the lower end of the rod 13 with the bottom wall of the well 22 also serves to rigidly hold the platen 7 in place. It is thus seen that the platen 7 is locked with the arch-frame 9 and forms in effect a strong integral structure therewith. When steam is introduced below the piston 12 in the cylinder 10, the piston is elevated, carrying with it the rod 13. The sectors 19 are now swung inwardly and upwardly. These sectors first clear the inner ends of the chairs 26 without causing any perceptible movement of the platen 7, which results from providing the upper ends of the links 23 with the elongated openings. Further movement of these sectors in the same direction cause the platen 7 to be elevated, through the medium of the links 23.

I wish it understood that the form of my invention herewith shown and described is to be taken as a preferred example of the same, and that certain changes in the shape, size, and arrangement of parts may be made without departing from the spirit of the invention or the scope of the subjoined claims.

Having thus described my invention, I claim:—

1. In a press of the character described, a supporting structure, an upper movable platen, pivoted sectors disposed above the same, means connecting said sectors with the platen, elements rigidly mounted upon the platen and disposed in the path of travel of the sectors, a lower movable platen, means to move the sectors, and means to move the lower platen.

2. In a press of the character described, a supporting structure, an upper movable platen, pivoted sectors disposed above the platen, links connecting the sectors and platen, said platen being provided upon its upper surface with a well, a rack bar operating in engagement with the sectors and adapted to engage the bottom of said well when said sectors have been swung to their lowermost positions, chairs rigidly mounted upon the platen and disposed in the path of travel of said sectors to define their lowermost positions, a lower platen, means to move the same, and means to move the rack-bar.

3. In a press of the character described, a supporting structure, a lower platen, an upper movable platen, pivoted sectors, means connecting the upper platen and sectors, chairs rigidly connected with the upper platen and disposed in the path of travel of said sectors, and means to move the sectors.

4. In a press of the character described, a supporting structure, co-acting platens, means connected with the supporting structure and adapted upon operation to first move one platen inwardly quickly, and subsequently rigidly lock the same platen with the supporting structure, and means to move the other platen inwardly.

5. In a press of the character described, a supporting structure, movable upper and lower platens, sectors pivotally connected with the upper platen, and elements rigidly connected with the upper platen and disposed in the path of travel of said sectors.

6. In a press of the character described, a base, posts disposed thereon, a hydraulic ram mounted upon the base and including a cylinder and piston operating therein, a platen connected with the upper end of the cylinder and guided in its movement by said posts, a second platen disposed above the first named platen, and guided in its movement by said posts, an arch-frame connected with the upper ends of the posts, sectors disposed in the arch-frame and pivotally connected therewith, links having pivotal connections with the lower portions of the sectors and the upper platen, chairs rigidly mounted upon the upper surface of the upper platen and disposed in the path of travel of said sectors, a cylinder rigidly mounted upon the arch-frame, a piston operating therein, and a rod having connection with the last named piston and disposed between said sectors and provided with teeth to engage the teeth of said sectors.

7. In a press of the character described, a supporting structure, co-acting platens, and means connected with the supporting structure and one platen and adapted to first move the same platen inwardly quickly and subsequently rigidly lock the same platen with the supporting structure.

In testimony whereof I affix my signature in presence of two witnesses.

DE LESLIE C. FITCH.

Witnesses:
JOHN T. LAYCOCK,
L. D. BEALE.

Copies of this patent may be obtained for five cents each, by addressing the "Commissioner of Patents, Washington, D. C."